(12) United States Patent
Tao

(10) Patent No.: US 11,787,244 B1
(45) Date of Patent: Oct. 17, 2023

(54) SPLIT TRAILER SHACKLE

(71) Applicant: qingdaohongmaijixieyouxiangongsi, Qingdao (CN)

(72) Inventor: Xiaomeng Tao, Ping Du (CN)

( * ) Notice: Subject to any disclaimer, the term of this patent is extended or adjusted under 35 U.S.C. 154(b) by 0 days.

(21) Appl. No.: 18/321,276

(22) Filed: May 22, 2023

(51) Int. Cl.
*F16G 5/06* (2006.01)
*B60D 1/04* (2006.01)
*F16G 15/06* (2006.01)

(52) U.S. Cl.
CPC ............... *B60D 1/04* (2013.01); *F16G 15/06* (2013.01)

(58) Field of Classification Search
CPC .. B60D 1/04; F16G 15/06; B66C 1/66; B66C 1/12; B66C 1/18; Y10T 24/1471; Y10T 24/3956; Y10T 403/32893; Y10T 403/599
See application file for complete search history.

(56) References Cited

U.S. PATENT DOCUMENTS

| | | | | |
|---|---|---|---|---|
| 116,212 A | * | 6/1871 | Newcomb | B66C 1/36 24/601.5 |
| 520,110 A | * | 5/1894 | Hull | F16G 15/06 278/96 |
| 3,106,420 A | * | 10/1963 | Elsner | B66C 1/38 294/82.33 |
| 4,093,293 A | * | 6/1978 | Huggett | F16G 15/04 24/600.1 |
| 8,056,196 B2 | * | 11/2011 | Sample | B64D 25/06 24/601.5 |
| 8,523,253 B1 | * | 9/2013 | Yustus | B66C 1/36 294/82.21 |
| 2020/0339391 A1 | * | 10/2020 | Chant | B66C 1/12 |

* cited by examiner

*Primary Examiner* — Robert Sandy
*Assistant Examiner* — Rowland Do
(74) *Attorney, Agent, or Firm* — Vladimir Postnikov

(57) ABSTRACT

A split trailer shackle is disclosed, including a bolt and a reinforcing assembly. The bolt includes a rod body, a middle of the rod body is rotatablely connected with a main hook, and an upper surface of a front end of the main hook is symmetrically provided with positioning blocks; a left end of the rod body is rotatablely connected with a secondary hook, the positioning blocks are detachably inserted with a slot at a front of the secondary hook respectively, and a right end of the bolt is threaded with a nut. The reinforcing assembly includes a rotating shaft and a positioning seat, the rotating shaft is disposed in a middle of the main hook. The reinforcing assembly further includes posts. The split trailer shackle is easy to open and thus can quickly sling, meanwhile it also can be closed for lock, and the use of high security.

7 Claims, 4 Drawing Sheets

SPLIT TRAILER SHACKLE

TECHNICAL FIELD

The present disclosure relates to the field of shackle technology, in particular to a split trailer shackle.

BACKGROUND

Shackles are commonly used in mechanical engineering connection equipment, engineering conventional shackles have a variety of forms such as European-style large bow shackle, round head shackle, square head shackle, D-shaped shackle, etc. The shackles have simple structures and a wide range of use, and are usually installed on the rear end of some trailer. Existing shackles generally is a semi-circular ring body, and then the other end is threaded with a pin body, when connecting to the trailer rope, the pin body needs to be disassembled, and repeated disassembly affects the convenience of use. There is also a split trailer shackle, which generally has two flaps, opening the flaps will form hooks with an opening, closing the flaps will form a closed ring. In this way, it is convenient to connect the trailer rope, but the two hooks generally lack a connection structure, and the two hooks are poorly connected independently of each other after closing, resulting in a lower strength of their own, and thereby affecting the safety of use. Therefore, the present disclosure provides a new split trailer shackle.

SUMMARY

In order to overcome existing defects, some embodiments of the present disclosure provide a split trailer shackle. The shackle is easy to open and thus can quickly sling, meanwhile it also can be closed for lock, and the use of high security, and thus can effectively solve problems in the background.

In some embodiments of the present disclosure, the split trailer shackle includes a bolt and a reinforcing assembly.

The bolt includes a rod body, a middle of the rod body is rotatablely connected with a main hook, and an upper surface of a front end of the main hook is symmetrically provided with positioning blocks; a left end of the rod body is rotatably connected with a secondary hook, the positioning blocks are detachably inserted with a slot at a front of the secondary hook respectively, and a right end of the bolt is threaded with a nut.

The reinforcing assembly includes a rotating shaft and a positioning seat, the rotating shaft is disposed in a middle of the main hook, an outer arc surface of the rotating shaft is rotatablely connected with a rotating hole of a rear end of the positioning seat, and a front of the positioning seat is configured to match with a right end of the secondary hook. In the process of use, the split trailer shackle can separate the main hook and the secondary hook to form an opening hook without disassembly, which facilitates the connection of the trailer rope, thus ensuring the convenience of use. Meanwhile the split trailer shackle can connect to the main hook and the secondary hook through a variety of components, and can be closed for lock, the main hook and the secondary hook closed with high structural strength, thus ensuring the safety of use.

In some embodiments, the reinforcing assembly further includes bumps disposed in the middle of the main hook and the right end of secondary hook respectively, and the bumps are located inside the positioning seat. In this way, the contact areas between the middle of the main hook, and the secondary hook to the positioning seat are increased.

In some embodiments, the reinforcing assembly further includes posts disposed on an upper surface of the bumps, and the posts are slidingly connected to chutes on an upper surface of the positioning seat. This enhances the strength of the connection between the secondary hook and the positioning seat.

In some embodiments, the reinforcing assembly further includes a reinforcing plate being provided at the chutes on the upper surface of the positioning seat. This guarantees the strength of the positioning seat itself.

In some embodiments, a leaf spring is disposed on an upper end of the rotating shaft, a right end of a lower surface of the leaf spring is provided with projections, a rear end of an upper surface of the positioning seat is provided with two recesses, the projections are configured to match the recesses, this facilitates the positioning of the positioning seat.

In some embodiments, the main hook and the secondary hook each is provided with a permanent magnet in its middle and two permanent magnets are magnetic adsorbed to facilitate the main hook and the secondary hook suction.

In some embodiments, a B-pin is fitted inside a pin hole at the right end of the bolt, and the B-pin is located on a right side of the nut to avoid accidental falling off of the nut.

Compared with existing technologies, the split trailer shackle of the present disclosure has following advantages.

1. When the trailer rope needs to be connected, the positioning seat can be rotated counterclockwise, thus the positioning seat drives the recesses to move, and the recess on the rear side slides relative to the projections. The projections are separated from the recess on the rear side and relative slide on the upper surface of the positioning seat. The projections drive the leaf spring to undergo elastic deformation, and then the projections correspond to the recess on the front side. The projections can position the positioning seat, and the positioning seat is separated from the bumps, and then the position seat will not restrict the separation of the main hook and the secondary hook, the main hook and the secondary hook will be unbolted. After the main hook and the secondary hook are separated, an opening will be created, then the trailer rope ring can be hooked up with the main hook and the secondary hook. And after hooking up, the main hook and the secondary hook will be combined to form a closed ring to avoid the loosening of the trailer rope ring. In the process of use, the split trailer shackle can separate the main hook and the secondary hook to form an open hook body without disassembly, which can facilitate the connection of the trailer rope and ensure the convenience of use.

2. The two permanent magnets magnetically attach to the main hook and the secondary hook to provide an attractive force so as to avoid separation the two, the positioning seat is reset and further restricts the separation of the main hook and the secondary hook. The posts can enhance the connection strength of the positioning seat and the secondary hook, the positioning blocks can avoid the misalignment of the main hook and the secondary hook and also enhance the connection strength of the main hook and the secondary hook. The split trailer shackle can be connected by a variety of components to the main hook and the secondary hook that can be closed for lock, after locked the main hook and the secondary hook has a high structural strength, which can ensure the safety of use.

In the figures, the reference signs are as follows. 1. bolt, 2. main hook, 3. secondary hook, 4. nut, 5. B-pin, 6. reinforcing assembly, 61. rotating shaft, 62. positioning seat, 63. bump, 64. post, 65. reinforcing plate, 7. leaf spring, 8. projection, 9. recess, 10. positioning block, 11. permanent magnet.

DETAILED DESCRIPTION OF THE EMBODIMENTS

The following will be a clear and complete description of the technical solutions in the embodiments of the present disclosure with reference the accompanying drawings. Obviously, the described embodiments are only a part of the embodiments of the present disclosure, and not all of them. Based on the embodiments of the present disclosure, all other embodiments obtained by a person of ordinary skill in the art without making creative labor, fall within the scope of the present disclosure.

Figure 1:
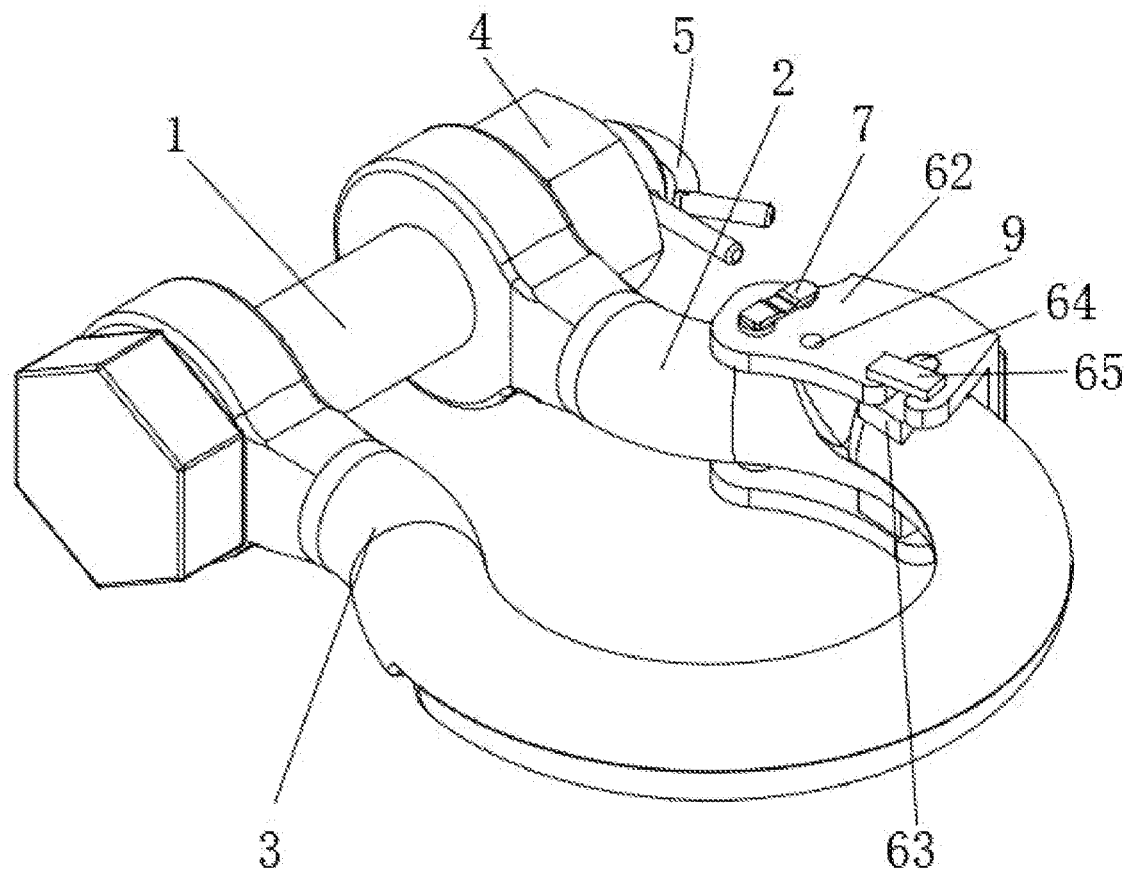
FIG. 1 is a schematic diagram of the structure of the split trailer shackle in accordance with some embodiments of the present disclosure.
Figure 2:
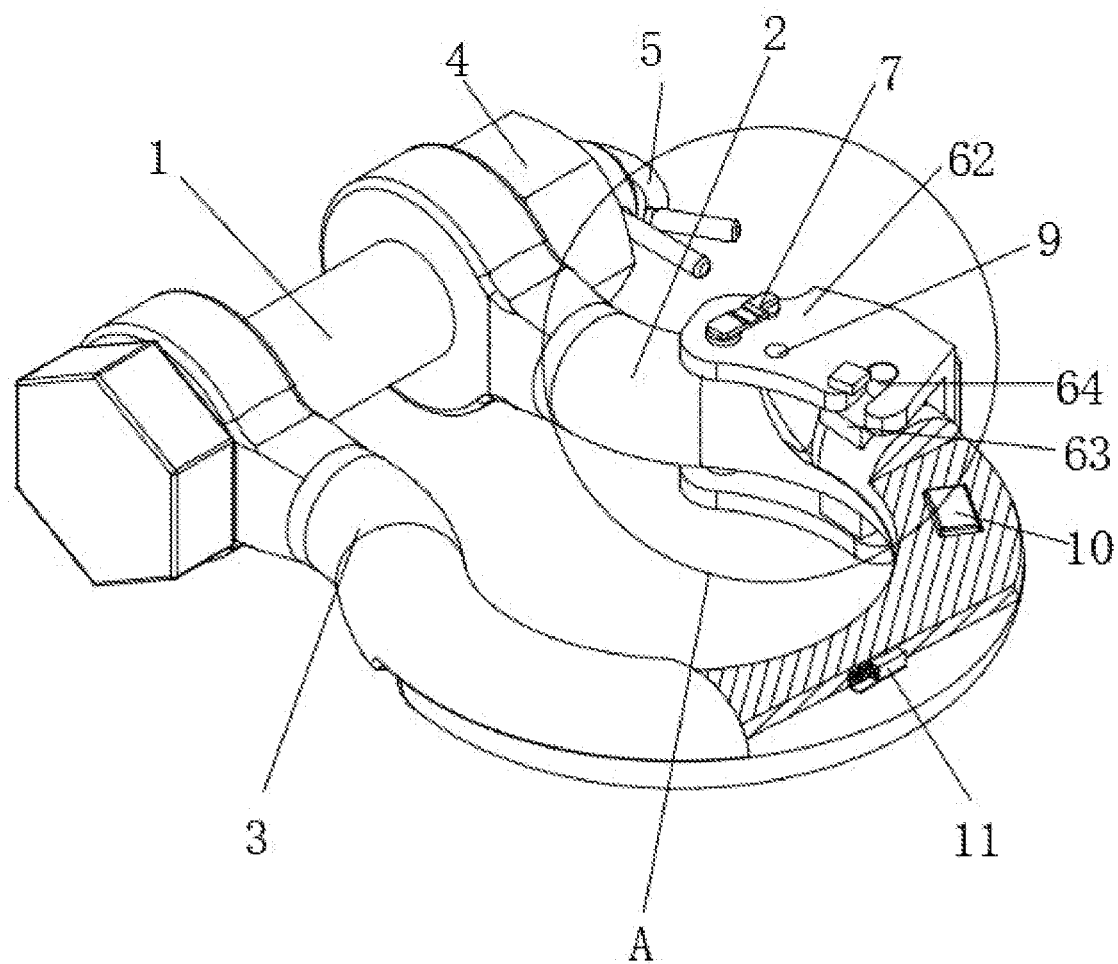
FIG. 2 is a schematic diagram of the cross-sectional structure of the reinforcing assembly in accordance with some embodiments of the present disclosure.
Figure 3:
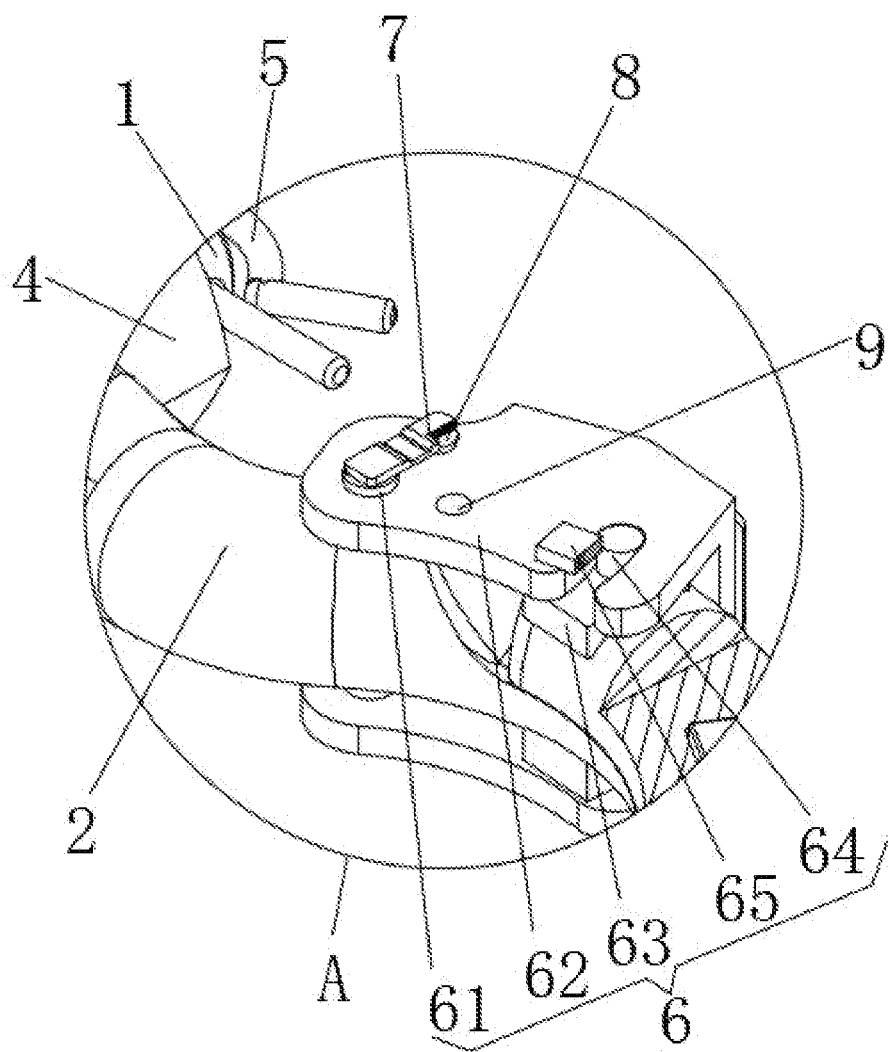
FIG. 3 is a schematic diagram of an enlarged structure of part A of FIG. 2.
Figure 4:
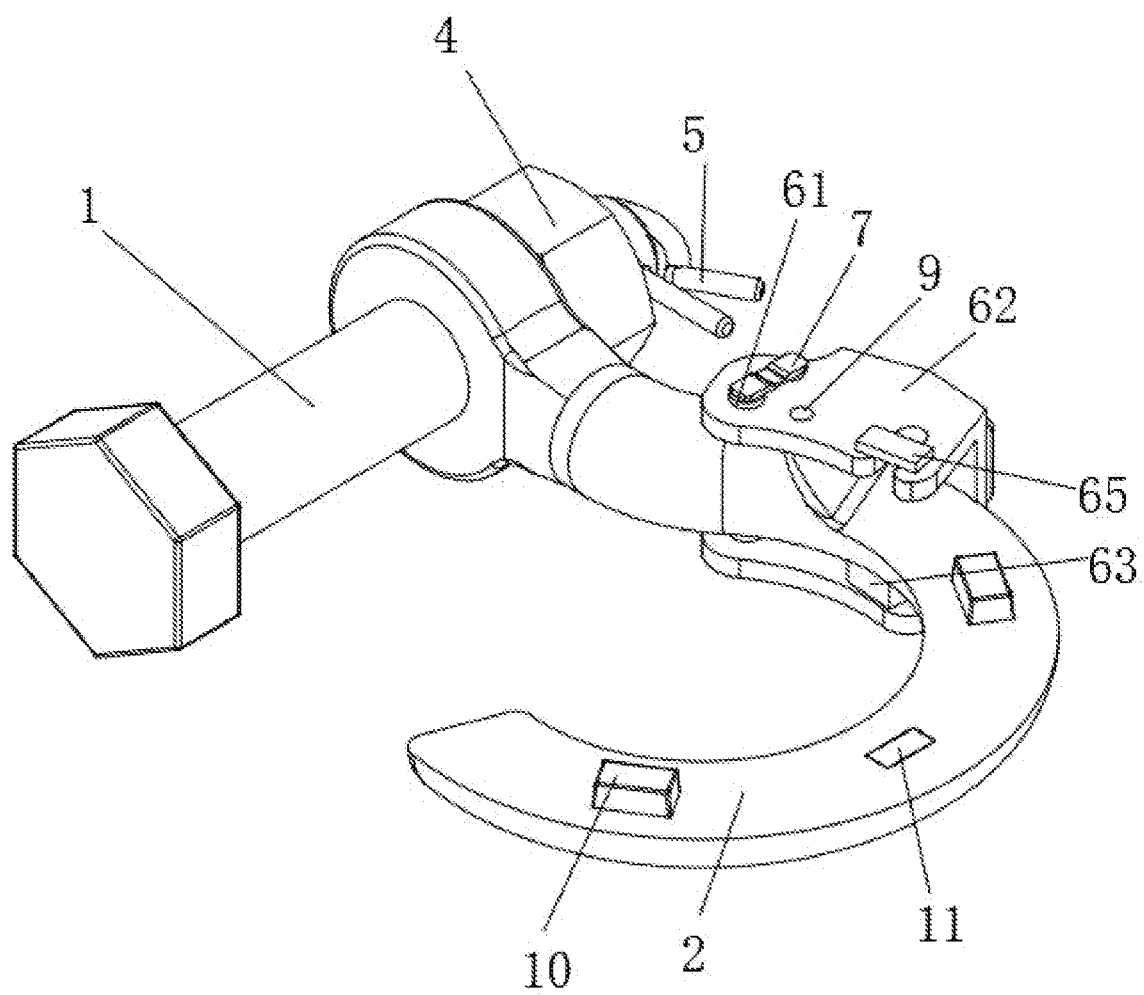
FIG. 4 is a schematic diagram of the structure of the main hook in accordance with some embodiments of the present disclosure.

Referring to FIG. 1 to FIG. 4, some embodiments of the present disclosure provide a split trailer shackle including a bolt 1 and a reinforcing assembly 6.

The bolt 1 includes a rod body, a middle of the rod body is rotatably connected with a main hook 2. The bolt 1 is connected to a connection hole of the trailer when used. An upper surface of a front end of the main hook 2 is symmetrically provided with positioning blocks 10, a left end of the rod body of the bolt 1 is rotatably connected with a secondary hook 3, and then the main hook 2 and the secondary hook 3 are broken apart, an opening will be created after the main hook 2 and the secondary hook are separated, the trailer rope ring can be hooked up with the main hook 2 and the secondary hook 3. After hooking up, the main hook 2 and the secondary hook 3 will be combined to form a closed ring to avoid a loosening of the trailer rope ring. The positioning blocks 10 are detachably inserted with a slot at a front of the secondary hook 3 respectively, the positioning blocks 10 can avoid the misalignment of the main hook 2 and the secondary hook 3 and thus improving the connection strength of the main hook 2 and the secondary hook 3. A right end of the bolt 1 is threaded with a nut 4, the nut 4 facilitates the installation of the main hook 2 and the secondary hook 3. The middle of the main hook 2 and the secondary hook 3 each is provided with a permanent magnet 11, this two permanent magnets 11 are magnetic adsorbed. The magnetic adsorption of the two permanent magnets 11 provides an attractive force to the main hook 2 and the secondary hook 3 to avoid separation. A B-pin 5 is fitted inside a pin hole at the right end of the bolt 1, and the B-pin 5 is located on a right side of the nut 4, the B-pin 5 can prevent the nut 4 from falling off.

The reinforcing assembly 6 includes a rotating shaft 61 and a positioning seat 62, the rotating shaft 61 is disposed in a middle of the main hook 2, an outer arc surface of the rotating shaft 61 is rotatably connected with a rotating hole of a rear end of the positioning seat 62, the rotating shaft 61 provides a rotational support to the positioning seat 62. A front of the positioning seat 62 is configured to match with a right end of the secondary hook 3, and the positioning seat 62 can be rotated counterclockwise when the trailer rope needs to be connected. The reinforcing assembly 6 further includes bumps 63 disposed in the middle of the main hook 2 and the right end of secondary hook 3 respectively, and the bumps 63 are located inside the positioning seat 62. The positioning seat 62 is separated from the bumps 63, thus the positioning seat 62 will not restrict the separation of the main hook 2 and the secondary hook 3. The reinforcing assembly 6 further includes posts 64 disposed on an upper surface of the bumps 63, and the posts 64 are slidingly connected to chutes on an upper surface of the positioning seat 62. The posts 64 can enhance the connection strength of the positioning seat 62 and the secondary hook 3. The reinforcing assembly 6 further includes a reinforcing plate 65 being provided at the chutes on the upper surface of the positioning seat 62, the reinforcing plate 65 can ensure the strength of the positioning seat 62 itself. A leaf spring 7 is disposed on an upper end of the rotating shaft 61, a right end of a lower surface of the leaf spring 7 is provided with projections 8, a rear end of an upper surface of the positioning seat 62 is provided with two recesses 9, and the projections 8 are configured to match with the recesses 9. The positioning seat 62 drives the recesses 9 to move, and the recesses 9 on the rear side slides relative to the projections 8. The projections 8 separates from the recesses 9 on the rear side and slides relative to the upper surface of the positioning seat 62. The projections 8 drive the leaf spring 7 to undergo elastic deformation, and then the projections 8 corresponds to the recesses 9 on the front side, the projections 8 can position the positioning seat 62.

The split trailer shackle provided by the present disclosure works as follows. When using, the bolt 1 is connected to the connection hole of the trailer, and when the trailer rope needs to be connected, the positioning seat 62 can be rotated counterclockwise, and the positioning seat 62 drives the recesses 9 to move. The recesses 9 on the rear side slides relative to the projections 8, the projections 8 separates from the recesses 9 on the rear side and slides relative to the upper surface of the positioning seat 62. The projections 8 drive the leaf spring 7 to undergo elastic deformation, and then the projections 8 corresponds to the recesses 9 on the front side, the projections 8 can position the positioning seat 62. The positioning seat 62 is separated from the bumps 63, thus the positioning seat 62 will not restrict the separation of the main hook 2 and the secondary hook 3. Then the main hook 2 and the secondary hook 3 are broken apart, an opening will be created after the main hook 2 and the secondary hook are separated, the trailer rope ring can be hooked up with the main hook 2 and the secondary hook 3. After hooking up, the main hook 2 and the secondary hook 3 will be combined to form a closed ring to avoid a loosening of the trailer rope ring. The magnetic adsorption of the two permanent magnets 11 provides an attractive force to the main hook 2 and the secondary hook 3 to avoid separation. Then the positioning seat 62 is reset and further restricts the separation of the main hook 2 and the secondary hook 3. The posts 64 can enhance the connection strength of the positioning seat 62 and the secondary hook 3. The positioning blocks can avoid the misalignment of the main hook 2 and the secondary hook 3, thereby enhancing the connection strength of the main hook 2 and the secondary hook 3.

The above is only some embodiments of the present disclosure and is not intended to limit the scope of this application. Any equivalent structure or equivalent process transformation using the specification and the accompanying drawings of the present disclosure, or applied direct or indirect in other related technical fields, is included in the scope of the patent protection of the present disclosure.

What is claimed is:

1. A split trailer shackle, comprising a bolt (1) and a reinforcing assembly (6);

wherein the bolt (1) comprises a rod body, a middle of the rod body is rotatablely connected with a main hook (2), and an upper surface of a front end of the main hook (2) is symmetrically provided with positioning blocks (10); a left end of the rod body is rotatablely connected with a secondary hook (3), the positioning blocks (10) are detachably inserted with a slot at a front of the secondary hook (3) respectively, and a right end of the bolt (1) is threaded with a nut (4);

wherein the reinforcing assembly (6) comprises a rotating shaft (61) and a positioning seat (62), the rotating shaft (61) is disposed in a middle of the main hook (2), an outer arc surface of the rotating shaft (61) is rotatablely connected with a rotating hole of a rear end of the positioning seat (62), and a front of the positioning seat (62) is configured to match with a right end of the secondary hook (3).

2. The split trailer shackle according to claim 1, wherein the reinforcing assembly (6) further comprises bumps (63) disposed in the middle of the main hook (2) and the right end of secondary hook (3) respectively, and the bumps (63) are located inside the positioning seat (62).

3. The split trailer shackle according to claim 2, wherein the reinforcing assembly (6) further comprises posts (64) disposed on an upper surface of the bumps (63), and the posts (64) are slidingly connected to chutes on an upper surface of the positioning seat (62).

4. The split trailer shackle according to claim 3, wherein the reinforcing assembly (6) further comprises a reinforcing plate (65) being provided at the chutes on the upper surface of the positioning seat (62).

5. The split trailer shackle according to claim 1, wherein a leaf spring (7) is disposed on an upper end of the rotating shaft (61), a right end of a lower surface of the leaf spring (7) is provided with projections (8), a rear end of an upper surface of the positioning seat (62) is provided with two recesses (9), the projections (8) are configured to match with the recesses (9).

6. The split trailer shackle according to claim 1, wherein the main hook (2) and the secondary hook (3) each is provided with a permanent magnet (11) in its middle and two permanent magnets (11) are magnetic adsorbed.

7. The split trailer shackle according to claim 1, wherein a B-pin (5) is fitted inside a pin hole at the right end of the bolt (1), and the B-pin (5) is located on a right side of the nut (4).

\* \* \* \* \*